United States Patent [19]

Silverstien

[11] Patent Number: 5,550,789
[45] Date of Patent: Aug. 27, 1996

[54] WATER TURBULENCE DETECTOR

[75] Inventor: Abraham Silverstien, Adelphi, Md.

[73] Assignee: The United States of America as represented by the Secretary of the Navy, Washington, D.C.

[21] Appl. No.: 181,607

[22] Filed: Sep. 17, 1971

[51] Int. Cl.$^6$ ................................................ G01S 15/00
[52] U.S. Cl. ............................. 367/94; 367/87; 181/0.5; 310/337
[58] Field of Search ................................ 340/1 R, 3 D, 340/3 R, 5 S; 343/5 W; 367/87, 93, 94; 181/123, 0.5; 310/337

[56] References Cited

U.S. PATENT DOCUMENTS 3,671,927 6/1972 Proudian et al. ................ 340/3 D

Primary Examiner—J. Woodrow Eldred
Attorney, Agent, or Firm—John Forrest; Jacob Shuster

[57] ABSTRACT

A Doppler shift flow meter array detects turbulence in the wake of a submarine. Three sets of transmitting and receiving sonic transducers are spaced in a line on a rigid support. The transmitting transducers emit ultrasonic energy which is reflected from particulate matter in a surrounding water medium. The reflected energy is detected by the receiving transducers. A digital Doppler meter associated with each set of transmitting and receiving transducers develops a digital count over a fixed interval that is equal to the Doppler shift between transmitted and received energy. First differences between adjacent pairs of digital Doppler meters are obtained by two digital subtractors, and the second difference between Doppler shifts is obtained by a third digital subtractor. The second difference is non-zero only when ocean turbulence is present, such as produced by a submarine.

7 Claims, 1 Drawing Sheet

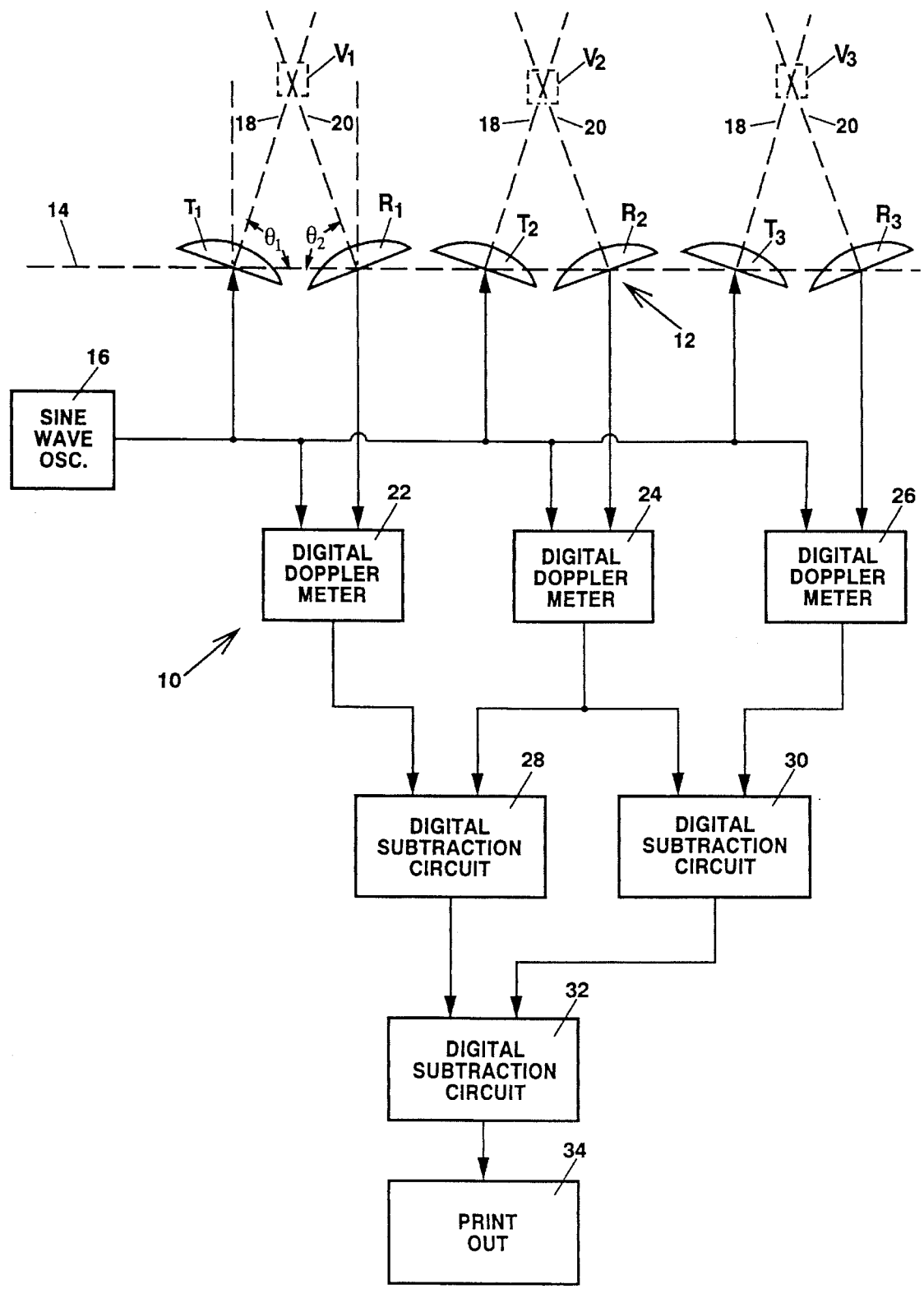

5,550,789

WATER TURBULENCE DETECTOR

BACKGROUND OF THE INVENTION

This invention relates generally to underwater acoustic detection systems and more particularly to underwater Doppler detection systems.

Underwater Doppler detection systems have been used frequently in the past to determine the relative velocity between a source of acoustic energy and a target. When a beam of ultrasonic energy is projected into an inhomogeneous fluid, some of the energy is scattered back in the direction of the transmitter. If a relative motion exists between the fluid and the transmitter, the reflected signal will differ in frequency from the transmitted signal by:

$$F_D = \frac{2 v F_T \sin \theta}{v + C} \quad (1)$$

where $F_D$ is the difference in frequencies, $F_T$ is the transmitted frequency, C is the speed of sound, and V is the magnitude of relative fluid velocity along a line normal to the transducer plane. If a separate receiver and transducer are used, the angle $\theta$ is the angle between the transducer axis and the transducer base line. A positive frequency shift occurs when the relative fluid velocity is toward the transducers, while a negative frequency shift occurs when the relative fluid velocity is away from the transducers.

While Doppler detectors have been utilized in the past to determine relative velocity between transmitter and target, prior art Doppler systems do not analize the vector gradient of the rotation of wakes and are thus incapable of detecting water turbulence produced by submarines.

SUMMARY OF THE INVENTION

Accordingly, one object of the present invention is to provide a new water turbulence detector.

Another object of the present invention is to provide a water turbulence detector capable of detecting the vector gradient of rotation of water wakes.

Still another object of the present invention is the provision of a water turbulence detector capable of detecting water turbulence produced by a submarine long after the submarine has produced such turbulence.

A further object of the present invention is to provide a detector for measuring low velocity vortices or other patterns left by a ship or submarine which may have passed hours earlier.

A still further object of the present invention is the provision of a detector for determining the direction in which a rotating wake is generated.

Briefly, in accordance with one embodiment of the present invention, these and other objects are attained by providing a water turbulence detector having three sets of transmitting and receiving transducers aligned along a straight line, wherein the transmit and receive pattern for each set intersect at a water volume a fixed distance from the transducer array. Ultrasonic energy is transmitted by each transmitting transducer and Doppler shifted reflected energy is received by each receiver transducer. The Doppler shift for each set of transmitting and receiving transducers is determined by three digital Doppler meters. First differences between Doppler frequencies of adjacent pairs of Doppler meters are calculated by two digital subtractors, and the second difference between Doppler frequencies is determined by a third digital subtractor. The second difference is non-zero only when ocean turbulence is present, such as produced by a submarine.

BRIEF DESCRIPTION OF THE DRAWING

A more complete understanding of the invention and many of the attendant advantages thereof will be readily appreciated as the same becomes better understood by reference to the following detailed description when considered in connection with the accompanying drawing wherein the sole FIGURE is a schematic block diagram view of the water turbulence detector of the present invention.

DESCRIPTION OF THE PREFERRED EMBODIMENT

Referring now to the sole FIGURE, a water turbulence detector 10 is illustrated as including an array 12 of conventional high frequency sonic transducers which are rigidly mounted in a straight line, indicated by dashed line 14, on the front of a ship or other vehicle so that the direction of vehicle motion is perpendicular to base line 14. Transducer array 12 consists of three transmitting transducers $T_1$, $T_2$ and $T_3$ and three receiving transducers $R_1$, $R_2$ and $R_3$ associated respectively with the three transmitting transducers. It should be understood, however, that all of the transducers in transducer array 12 may be identically constructed since conventional ultrasonic transducers can transmit and receive ultrasonic energy. Furthermore, while the sole FIGURE illustrates three sets of transmitting and receiving transducers, it should be understood that additional sets can be used for increased reliability and accuracy in measuring water turbulence.

Transmitting transducers $T_1$, $T_2$ and $T_3$ are driven by a conventional sine wave oscillator 16, and each produces a highly collimated beam of ultrasonic energy along a transducer axis 18. Transmitting transducers $T_1$, $T_2$, $T_3$ are positioned along base line 14 so that transducer axis 18 forms an angle $\theta_1$ with base line 14. Similarly, receiving transducers $R_1$, $R_2$ and $R_3$ have highly collimated receiving patterns along a receiving axis 20, and these transducers are rotated toward their respective transmitting transducers so that receiving axis 20 forms an angle $\theta_2$ with base line 14 and axes 18 and 20 intersect at a fixed distance from base line 14. It should be understood that $\theta_1$, may equal $\theta_2$. The intersection volume for the collimated transmission beam along axis 18 for transducer $T_1$ and the collimated receiving pattern along axis 20 for transducer $R_1$ is designated as $V_1$ in the sole FIGURE. Similarly, the intersection volume for transducers $T_2$ and $R_2$ is designated as $V_2$ and the intersection volume for transducers $T_3$ and $R_3$ is designated as $V_3$.

Volumes $V_1$, $V_2$ and $V_3$ are illuminated by transducer array 12 for purposes of Doppler analysis, as explained hereinafter. Since these three volumes are physically separated, the frequency information corresponding to the velocity of the particulate matter relative to transducer array 12 will be distinct for each volume. By analyzing the Doppler shifts for each of these separate volumes, the present invention obtains a velocity profile for the overall water volume that includes these three volumes. If a submarine previously has passed through the area, it gives a backward thrust to the water at the propeller and a forward drag elsewhere, especially at the stern. These opposed and separated forces are couples which generate rotating vortices in a ring-shaped pattern around the path of the submarine. Due to the drag of the surrounding water on the rotating vortex, the water at the edges of the vortex slows most rapidly while the angular velocity of the water near the axis of rotation slows least. Consequently a velocity gradient is developed in the water contained within the vortex that lasts for a considerable period of time, for example an hour or more, even though the rotating water velocity is greatly reduced by drag. By analyzing distinct water volumes, the present invention detects the presence of water velocity gradients characteristic of vortices produced by submarines.

As the ship or other vehicle on which transducer array 12 is mounted travels through the water, it will contribute a forward velocity to transducer array 12 relative to the surrounding water medium which will contribute a Doppler shift between the transmitted and received frequencies of F. If the vehicle turns about an axis to a side of transducer array 12, then the transducer closest to this axis has an additional velocity $v_t$ corresponding to an additional Doppler shift $f_t$. The next transducer, being a greater distance from the turn axis, has an added velocity $v_t+K$ corresponding to an added Doppler shift of $f_t+f_k$. The third transducer, which is still further from the turning axis, has an added velocity of $v_t+2k$ corresponding to an additional Doppler shift of $f_t+2f_k$. If the transducer array is not parallel to the turning plane, the turn velocities are reduced to their projection on this plane. Finally, the water in volumes $V_i$ will have velocities $v_i$ produced by movement of the water corresponding to Doppler shifts $f_i$, i=1, 2 and 3. These velocities are independent due to the physical separation of the three illuminated water volumes and may have mixed positive and negative signs depending upon the movement of water in these three volumes. The sum of the Doppler shifts due to the forward velocity of the vehicle, the turning velocity of each transducer, and the turbulence velocity in each illuminated water volume produces distinct Doppler shifts $F_{R1}$, $F_{R2}$ and $F_{R3}$ at receiving transducers $R_1$, $R_2$ and $R_3$ wherein:

$$F_{R1}=F+f_t+f_k+f_1 \quad (2)$$

$$F_{R2}=F+f_t+2f_k+f_2 \quad (3)$$

$$F_{R3}=F+f_t+3f_k+f_3 \quad (4)$$

Obviously, if the vessel on which transducer array 12 is mounted is moving along a straight line, there will be no Doppler shifts due to turning, and the $f_t$ and $f_k$ terms disappear.

The received signal from transducer $R_1$ and the transmitted signal from sine wave oscillator 16 are both applied to the input of a conventional digital Doppler meter 22 whose output is a digital pulse count over a fixed preset interval, such as one second, which gives the Doppler shift $F_{R1}$ between transmitted and received signals, and consequently the relative velocity of the water in volume $V_1$ relative to the velocity of transducers $T_1$ and $R_1$. Similarly, the received signal from transducer $R_2$ and the transmitted signal from sine wave oscillator 16 are both applied to an identical digital Doppler meter 24, and the received signal from transducer $R_3$ and the transmitted signal from sine wave oscillator 16 are both applied to an identical digital Doppler meter 26. Digital Doppler meter 24 produces a digital pulse count over the same fixed preset interval which gives the Doppler shift $F_{R2}$ between the transmitted signal and the received signal at transducer $R_2$ corresponding to the velocity of the water in volume $V_2$ relative to transducers $T_2$ and $R_2$. Digital Doppler meter 26, likewise, produces a digital pulse count over the same fixed preset interval which gives the Doppler shift $F_{R3}$ between the transmitted signal from transducer $T_3$ and the received signal at transducer $R_3$ corresponding to the velocity of water volume $V_3$ relative to transducers $T_3$ and $R_3$.

At the end of the preset timing interval the output count of digital Doppler meter 22 is subtracted from the output count of digital Doppler meter 24 in a conventional digital subtraction circuit 28. If the count from meter 24 is higher than the count from meter 22 the resulting output from digital subtraction circuit 28 will be positive, whereas if the count from meter 22 is greater than the count from meter 24, the output of digital subtraction circuit 28 will be negative. Similarly, at the end of the present timing interval, the count from digital Doppler meter 24 is subtracted from the count from digital Doppler meter 26 in a conventional digital subtraction circuit 30. If the count from meter 26 is greater than the count from meter 24 the resulting output from digital subtraction circuit 30 will be positive, while if the count from meter 24 is greater than the count from meter 26 the output from digital subtraction circuit 30 will be negative. Then, the second difference is taken by subtracting the output of digital subtraction circuit 28 from the output of digital subtraction circuit 30 in a third digital subtraction circuit 32. The first differences $F_{D1}$ and $F_{D2}$ produced by digital subtraction circuits 28 and 30, respectively, remove the count produced by the forward motion of the vehicle on which transducer array 12 is mounted, as shown in equations (5) and (6), respectively, while the second difference $F_{DD}$ produced by digital subtraction circuit 32 removes the count produced by turning of the vehicle on which transducer array 12 is mounted as shown in equation (7).

$$F_{D1}=F_{R2}-F_{R1}=f_k+f_2-f_1 \quad (5)$$

$$F_{D2}=F_{R3}-F_{R2}=f_k+f_3-f_2 \quad (6)$$

$$F_{DD}=F_{D2}-F_{D1}=f_3-2f_2-f_1 \quad (7)$$

The sign of $F_{DD}$ depends upon the direction of vortex rotation, the portion illuminated, and the direction along which the vortex is illuminated. Consequently, the resulting count produced by digital subtraction circuit 32 is indicative of the velocities of the water in water volumes $V_1$, $V_2$ and $V_3$ and represents turbulence in the water in which these three water volumes are contained. The magnitude and sign of the output $F_{DD}$ from digital subtraction circuit 32 give the magnitude and sense of the velocity gradient. This count is fed to a conventional printout device 34 which plots magnitude and sense of the velocity gradient versus time. Thus, at the end of each preset time interval determined by digital Doppler meters 22, 24 and 26, a point is plotted corresponding to the output of digital subtraction circuit 32.

Transducer array 12 may enter a water flow pattern with all of its transducers in a line of equal velocity. This corresponds to a null detection where $F_{DD}=0$. While a single transducer array 12 can explore a water field by repeated passes from different directions, it is contemplated that two perpendicularly mounted transducer arrays be used to reduce the number of passes required. By making multiple passes, the direction of rotation of the entire wake can be determined, and consequently the direction of travel of the submarine can be determined.

Obviously, numerous modifications and variations of the present invention are possible in the light of the above teachings. For example, Doppler flow meters using lasers could be used rather than the ultrasonic transducer array of the present invention. Since a laser Doppler flow meter has much higher output frequency than a sonic meter, the short interval resolution is higher. Furthermore, since any vehicle velocity is extremely small compared to light propagation in water, linearity is practically perfect. Alternatively a set of Pitot tubes could replace the transmitting and receiving transducers and be fitted with vibration pressure transducers or vibrating quartz pressure transducers and give a frequency output. However, they would have to be critically adjusted to match and these are not inherently linear devices. It is therefore to be understood that within the scope of the appended claims, the invention may be practiced otherwise than as specifically described herein.

What is claimed as new and desired to be secured by Letters Patent of the United States is:

1. A water turbulence detection system comprising:

at least three means for transmitting acoustic ultrasonic energy into a water medium and for receiving reflections of said acoustic ultrasonic energy produced by said water medium;

at least three means, each associated with a different one of said transmitting and receiving means, for digitally computing the Doppler shift between said transmitted acoustic ultrasonic energy and said reflections of said acoustic ultrasonic energy; p1 at least two first subtraction means, each for digitally computing the difference between the outputs of adjacent pairs of said means for digitally computing the Doppler shift; and p1 at least one second subtraction means for computing the digital difference between the outputs of said first subtraction means to thereby indicate water turbulence.

2. The water turbulence detection system of claim 1, wherein each of said transmitting and receiving means comprises: p1 an electro-acoustic transducer connectable to a source of electrical alternating current energy for transducing said electrical alternating current energy into said acoustic ultrasonic energy and for transmitting said acoustic ultrasonic energy into said water medium; and p1 an electro-acoustic transducer for receiving said reflections of said acoustic ultrasonic energy and for converting said received reflections of said acoustic ultrasonic energy into received alternating current electrical energy.

3. The water turbulence detection system of claim 1, wherein each of said means for digitally computing the Doppler shift comprises a digital Doppler meter.

4. The water turbulence detection system of claim 1, wherein each of said first subtraction means comprises a digital subtraction circuit.

5. The water turbulence detection system of claim 1, wherein said second subtraction means comprises a digital subtraction circuit.

6. The water turbulence detection system of claim 1, further including means for printing out the output of said second digital subtraction means.

7. The water turbulence detection system of claim 1, wherein all of said transmitting and receiving means are aligned along a single axis.

* * * * *